US011242043B2

(12) United States Patent
Reuter (10) Patent No.: US 11,242,043 B2
(45) Date of Patent: Feb. 8, 2022

(54) ELECTRO-HYDRAULIC BRAKE SYSTEM (71) Applicant: BWI (Shanghai) Co., Ltd., Shanghai (CN)

(72) Inventor: David Fredrick Reuter, Moraine, OH (US)

(73) Assignee: BWI (SHANGHAI) CO., LTD., Shanghai (CN)

(*) Notice: Subject to any disclaimer, the term of this patent is extended or adjusted under 35 U.S.C. 154(b) by 205 days.

(21) Appl. No.: 16/537,616

(22) Filed: Aug. 11, 2019

(65) Prior Publication Data
US 2020/0047731 A1 Feb. 13, 2020

Related U.S. Application Data (60) Provisional application No. 62/717,893, filed on Aug. 12, 2018.

(30) Foreign Application Priority Data

Jul. 19, 2019 (CN) .......................... 201910654383.7

(51) Int. Cl.
*B60T 13/66* (2006.01)
*B60T 13/74* (2006.01)
(52) U.S. Cl.
CPC ............ *B60T 13/66* (2013.01); *B60T 13/745* (2013.01); *B60T 2270/402* (2013.01)
(58) Field of Classification Search
CPC ........ B60T 8/171; B60T 8/172; B60T 13/146; B60T 13/662; B60T 13/686; B60T 13/745; B60T 13/66; B60T 13/74
(Continued)

(56) References Cited

U.S. PATENT DOCUMENTS 5,927,825 A 7/1999 Schenk et al.
6,533,369 B2 3/2003 Baumgartner et al.
(Continued)

FOREIGN PATENT DOCUMENTS

EP 2835293 A1 2/2015

OTHER PUBLICATIONS

First Office Action and search report dated Apr. 1, 2020 for counterpart Chinese patent application No. 201910654383.7, along with machine EN translation downloaded from EPO.
(Continued)

*Primary Examiner* — Christopher P Schwartz
(74) *Attorney, Agent, or Firm* — William H. Honaker; Dickinson Wright PLLC (57) ABSTRACT

An electro-hydraulic brake system includes a master cylinder block in communication with a reservoir tank containing a brake fluid. A protrusion extends from the master cylinder block to a terminal end. The master cylinder block defines a channel extending along a center axis into the protrusion. A pressure supply unit includes a housing defining a chamber and is in communication with the reservoir tank. A displacement piston, slidably disposed in the channel, extends between a primary end located in the chamber and a secondary end located in the channel. An actuator is disposed in the chamber, rotatably coupled to the displacement piston, for axial movement along the center axis. A first anti-rotational member is disposed in the channel, coupled to the terminal end, for engaging the secondary end to prevent rotation and translate rotational movement of the actuator into the axial movement.

20 Claims, 8 Drawing Sheets

(58) Field of Classification Search
USPC ............. 303/114.1; 60/533, 534, 545, 547.1, 60/547.2, 554, 561; 188/358
See application file for complete search history.

(56) References Cited

U.S. PATENT DOCUMENTS

| | | | |
|---|---|---|---|
| 9,902,382 B2* | 2/2018 | Lee ..................... | B60T 11/165 |
| 2017/0313294 A1* | 11/2017 | Ishino .................. | B60T 13/745 |
| 2018/0009425 A1* | 1/2018 | Feigel .................. | B60T 13/745 |
| 2019/0100172 A1* | 4/2019 | Lee ..................... | F16H 25/2015 |
| 2019/0100188 A1* | 4/2019 | Lee ..................... | B60T 8/4018 |
| 2019/0248348 A1* | 8/2019 | Ganzel ................. | B60T 13/662 |
| 2021/0070273 A1* | 3/2021 | Timm .................. | B60T 17/221 |

OTHER PUBLICATIONS

Extended European Search Report dated Jan. 7, 2020 for counterpart European patent application No. 19190540.5.
Second Office Action dated Nov. 16, 2020 for counterpart Chinese patent application No. 201910654383.7, along with EN translation.

* cited by examiner

ELECTRO-HYDRAULIC BRAKE SYSTEM

CROSS-REFERENCE TO RELATED APPLICATIONS

This application claims priority to U.S. Provisional Application Patent Ser. No. 62/717,893, filed Aug. 12, 2018, and China Application No. 201910654383.7, filed Jul. 19, 2019, the entire disclosures of which are hereby incorporated herein by reference.

BACKGROUND OF THE INVENTION

1. Field of the Invention

The present invention generally relates to an electro-hydraulic brake system for a vehicle.

2. Description of the Prior Art

As electric and hybrid vehicles continue to proliferate in markets around the world, it is well understood that significant lengthening of battery life can be obtained by utilizing the motor-generator output capabilities of that device during braking. However, the input torque in the generator mode used to recharge batteries is not consistent with driver input function of pedal force/travel verses vehicle deceleration. In order to achieve that complex function, the hydraulic brakes of the vehicle must supply the difference between generator braking torque and driver requested braking torque.

The engineering world has understood this requirement for a number of years commonly known as regenerative brake blending. A most efficient way to achieve this is to use a "brake-by-wire" technique. To accomplish this, the brake pedal in effect becomes a joy stick, so it must be connected to a travel and/or force sensor in order to send a signal to the system ECU that will interpret this as driver's intent of a desired vehicle deceleration. In addition, the brake pedal "feel" must be simulated by the appropriate force-travel relationship and must also have the ability to be isolated from directly applying the master cylinder to the wheel brakes.

As first noted regarding the proliferation of hybrid and electric vehicles in the world, there is another phenomenon taking place as well, being the push for autonomous, self-driving vehicles. As a result, the Society of Automotive Engineers (SAE) has developed guidelines for the path to autonomy range from level 0 to level 5. Level 0 is no automation. Level 1 is driver assistance required, e.g. adaptive cruise control. Level 2 is partial automation, e.g. Cadillac Super Cruise—driver keep hand on steering wheel. Level 3 is conditional automation, e.g. Audi Traffic Jam Pilot. Level 4 is high automation, e.g. self-driving vehicle with some very specific speed restrictions. Level 5 is full automation where the vehicle can operate at the same level as a human driver.

One such an electro-hydraulic brake system is disclosed in U.S. Pat. No. 9,205,821. The electro-hydraulic system includes a master cylinder block disposed in fluid communication with a reservoir tank containing a brake fluid. A manifold block is disposed in fluid communication with the master cylinder block for supplying the brake fluid from the master cylinder block to wheel brakes of the vehicle. A pressure supply unit, coupled to the master cylinder block, is in fluid communication with the reservoir tank for supplying the brake fluid from the reservoir tank. The pressure supply unit includes a displacement piston. An actuator is disposed in the chamber for moving the displacement piston.

SUMMARY OF THE INVENTION

The present invention provides an electro-hydraulic brake system having improved response time which allows for an immediate switching to a master cylinder mode which meets a minimum of level 4 of the SAE's path to autonomy range. The present invention also provides an electro-hydraulic brake system that locks the pressure supply unit in response to a pressure supply unit failure. In addition, the present invention provides an easy to manufacture electro-hydraulic brake system allowing the use of existing, low cost extrusion and machining processes. The present invention further provides an electro-hydraulic brake system having improved cooling.

It is one aspect of the present invention to provide an electro-hydraulic brake system for a vehicle. The electro-hydraulic brake system includes a master cylinder block disposed in fluid communication with a reservoir tank containing a brake fluid. A protrusion extends outwardly from a rear surface of the master cylinder block to a terminal end. The master cylinder block defines a channel extending along a center axis into the protrusion and spaced from the terminal end. A pressure supply unit, coupled to the master cylinder block, is in fluid communication with the reservoir tank for supplying the brake fluid from the reservoir tank. The pressure supply unit includes a housing defining a chamber. A displacement piston, slidably disposed in the channel, extends along the center axis between a primary end and a secondary end. The primary end is disposed in the chamber. The secondary end is disposed in the channel. An actuator is disposed in the chamber, rotatably coupled to the displacement piston, for moving the displacement piston along the center axis. A first anti-rotational member is disposed in the channel, coupled to the terminal end, for engaging the secondary end of the displacement piston to prevent rotation of the displacement piston and translate rotational movement of the actuator into an axial movement.

It is another aspect of the present invention to provide an electro-hydraulic brake system for a vehicle. The electro-hydraulic brake system includes a master cylinder block disposed in fluid communication with a reservoir tank containing a brake fluid. A manifold block is disposed in fluid communication with the master cylinder block for supplying the brake fluid from the master cylinder block to wheel brakes of the vehicle. A protrusion extends outwardly from a rear surface of the master cylinder block to a terminal end. The master cylinder block defines a channel extending along a center axis into the protrusion and spaced from the terminal end. A pressure supply unit, coupled to the master cylinder block, is in fluid communication with the reservoir tank for supplying the brake fluid from the reservoir tank. The pressure supply unit includes a housing defining a chamber. A displacement piston, slidably disposed in the channel, extends along the center axis between a primary end and a secondary end. The primary end is disposed in the chamber. The secondary end is disposed in the channel. An actuator is disposed in the chamber, rotatably coupled to the displacement piston, for moving the displacement piston along the center axis. A first anti-rotational member is disposed in the channel, coupled to the terminal end, for engaging the secondary end of the displacement piston to prevent rotation of the displacement piston and translate rotational movement of the actuator into an axial movement.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
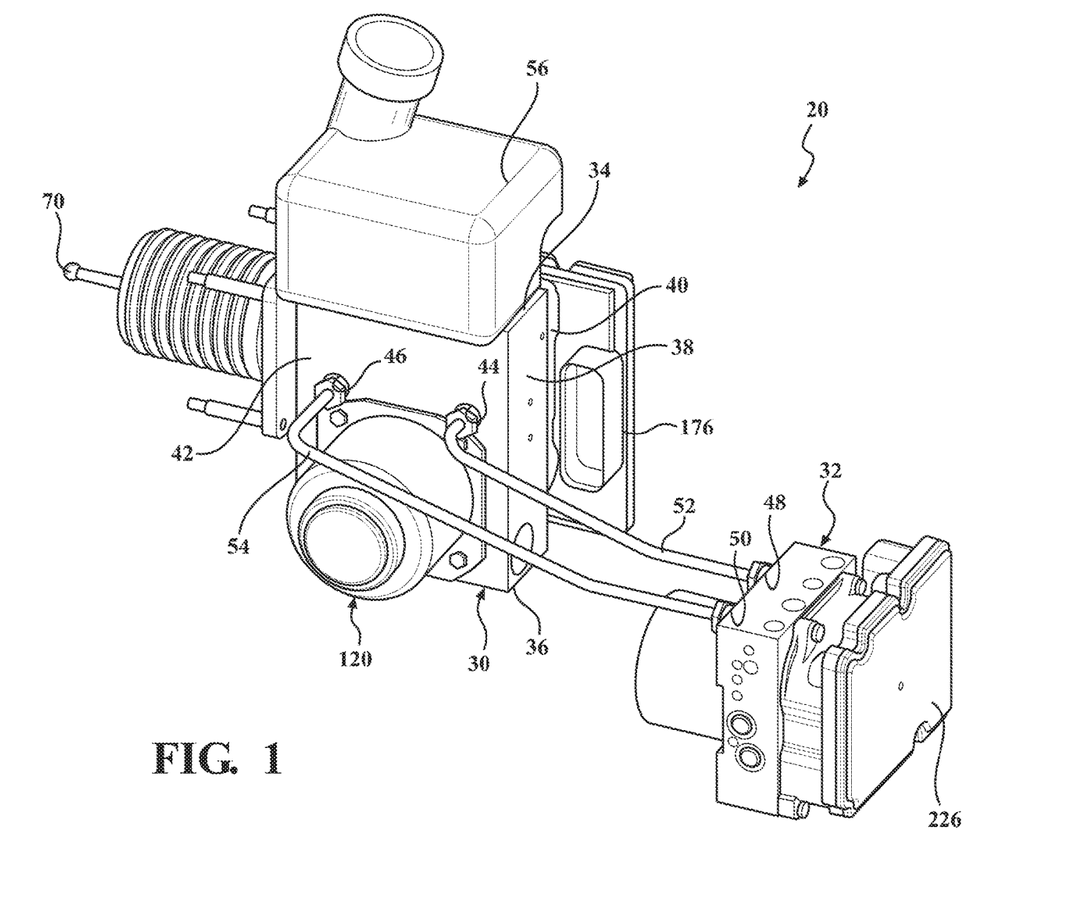
FIG. 1 is a perspective view of an electro-hydraulic brake system in accordance with one embodiment of the preset invention.

Referring to the Figures, wherein like numerals indicate corresponding parts throughout the several views, an electro-hydraulic brake system 20 constructed in accordance with one embodiment of the present invention is generally shown in FIG. 1. Typically, the electro-hydraulic brake system 20 can be implemented in an automobile vehicle having four wheel brakes 22, 24, 26, 28 including a pair of front wheel brakes 22, 24 and a pair rear wheel brakes 26, 28.

Referring to FIG. 1, the electro-hydraulic brake system 20 is a two-box system including a master cylinder block 30 in fluid communication with a manifold block 32. The master cylinder block 30, having a generally rectangular shape, includes a plurality of surfaces having a top surface 34, a bottom surface 36, a pair of side surfaces 38, a front surface 40 and a rear surface 42. The top and the bottom surfaces 34, 36 are opposite and spaced from one another. The side surfaces 38, opposite and spaced from one another, connect the top surface 34 and the bottom surface 36 to one another establishing the rectangular shape. The front and rear surfaces 40, 42 connect to the top, the bottom, and the side surfaces 38 forming the master cylinder block 30. The front surface 40 of the master cylinder block 30 defines a primary opening 44 and a secondary opening 46 for fluid connection with the manifold block 32.

The manifold block 32, also having a generally rectangular shape and spaced from the master cylinder block 30, is in fluid communication with the wheel brakes 22, 24, 26, 28 for supplying a brake fluid from the master cylinder block 30 to the wheel brakes 22, 24, 26, 28 of the vehicle. The manifold block 32 defines a primary inlet 48 and a secondary inlet 50, each having a generally circular shape, for fluid connection with the master cylinder block 30. At least one fluid connection line 52, 54 extends between the master cylinder block 30 and the manifold block 32 connecting the master cylinder block 30 with said manifold block 32 to establish a fluid connection from the master cylinder block 30 to the wheel brakes 22, 24, 26, 28 of the vehicle. The at least one fluid connection line 52, 54 includes a primary fluid connection line 52 and a secondary fluid connection line 54. The primary fluid connection line 52 extending between the primary inlet 48 of the manifold block 32 and the primary opening 44 of the master cylinder block 30. The secondary fluid connection line 54 extends between the secondary inlet 50 of the manifold block 32 and the secondary opening 46 of the master cylinder block 30. In other words, the primary inlet 48 is in fluid communication with the primary opening 44 and the secondary inlet 50 is in fluid communication with the secondary opening 46.

Figure 2:
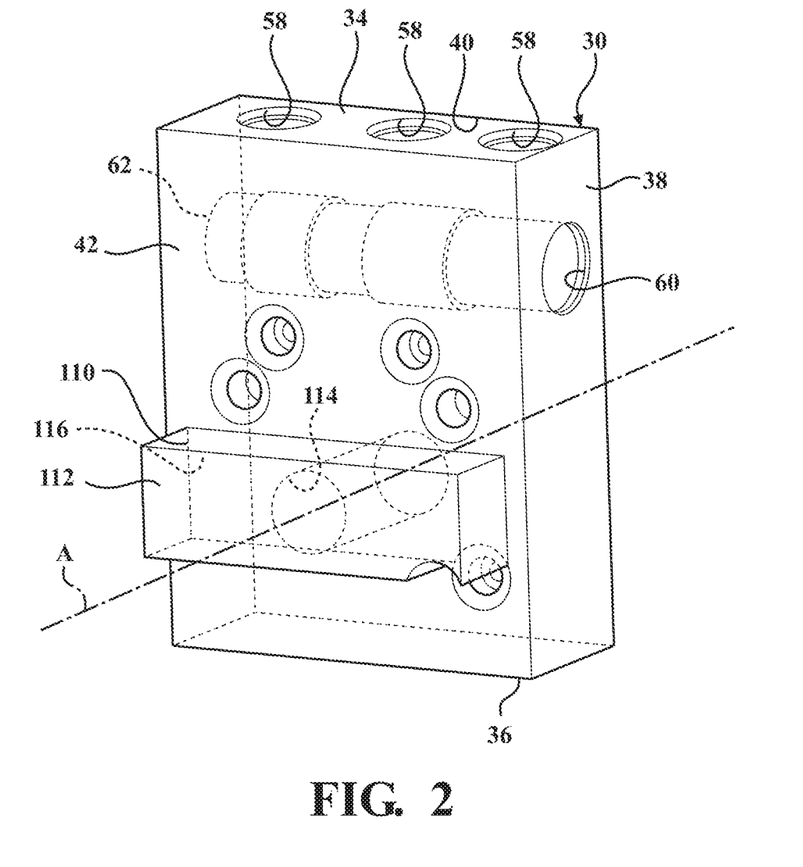
FIG. 2 is a rear perspective view of a master cylinder block of the electro-hydraulic brake system.

A reservoir tank 56 connects to the top surface 34 of the master cylinder block 30 for containing and supply brake fluids to the electro-hydraulic brake system 20. As best illustrated in FIG. 2, the top surface 34 of the master cylinder block 30 defines a plurality of holes 58, each having a generally circular shape and spaced from one another, in fluid communication with the reservoir tank 56 to allow fluid transfer between the reservoir tank 56 and the master cylinder block 30. One of the side surfaces 38 defines a bore 60, having a generally cylindrical shape, disposed adjacent to the top surface 34 and in fluid communication with the holes 58. The bore 60 extends along the master cylinder block 30 parallel to the top and bottom surfaces 34, 36 and terminating at a distal end 62 spaced from another one of the side surfaces 38.

Figure 3:
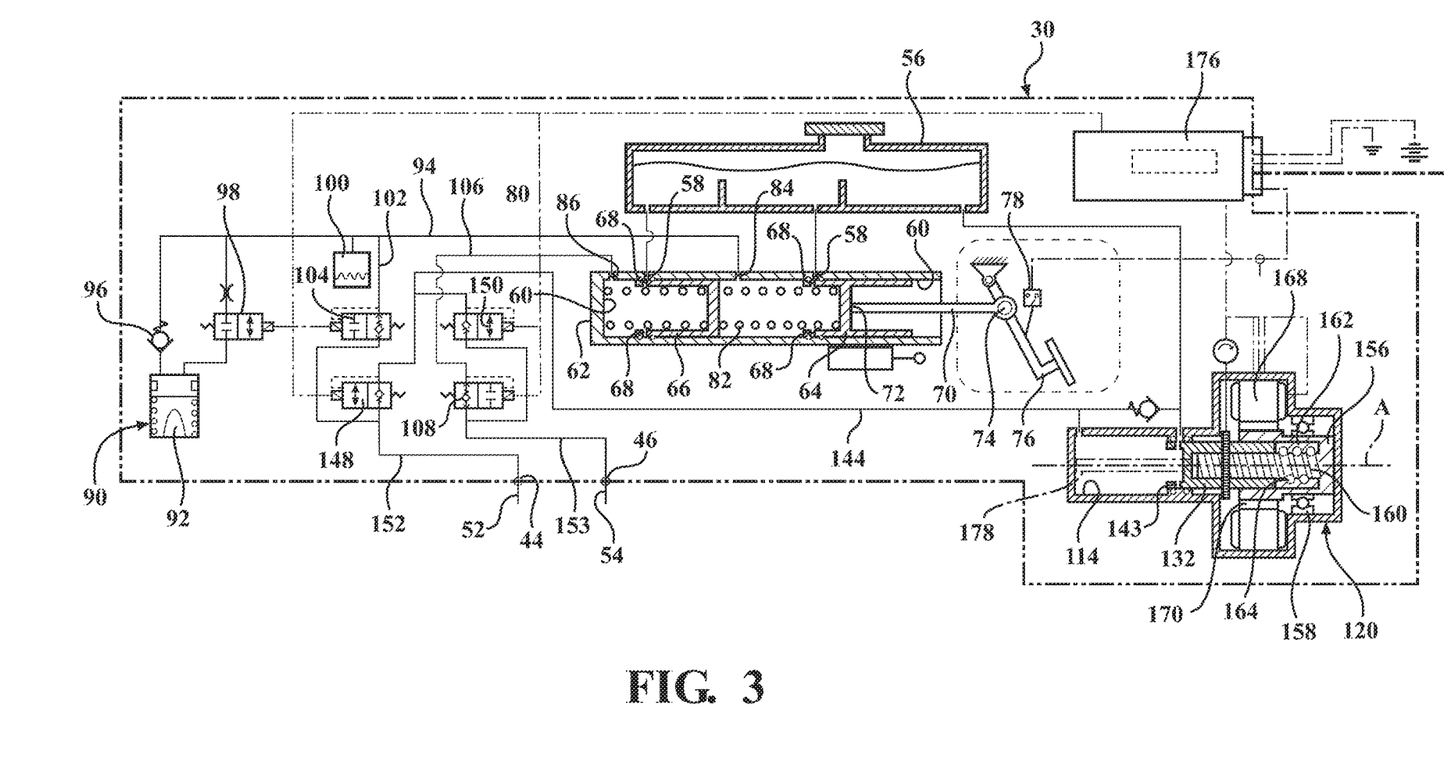
FIG. 3 is a schematic view of the master cylinder block and the electronic control unit.

As best illustrated in FIG. 3, the master cylinder block 30 has at least one brake piston 64, 66 slidably disposed in the bore 60. The at least one brake piston 64, 66 includes a primary piston 64 and a secondary piston 66 disposed in a tandem relationship with one another. The secondary piston 66, having a generally U-shaped cross-section, is located in the bore 60 adjacent to the distal end 62 of the bore 60. The primary piston 64, having a generally H-shaped cross-section, is located in the bore adjacent and spaced from the secondary piston 66. Each of the pistons 64, 66 define at least one aperture 68 for regulating the flow of the brake fluid from the reservoir tank 56 to the bore 60. In another arrangement, instead of the two pistons 64, 66 being disposed in a tandem relationship with one another, the present invention can include one piston disposed in the bore 60 for regulating the flow of the brake fluid.

A push rod 70, slidably disposed in the bore 60, extends between a first end 72 and a second end 74 for moving the at least one piston 64, 66 in the bore 60. The first end 72 is in an abutment relationship with the primary piston 64. The second end 74 is coupled to a brake pedal 76 for allowing a user to move the pistons 64, 66, via the brake pedal 76, between an opened position and a closed position. The opened position is defined as the at least one aperture 68 being in communication or alignment with the holes 58 for allowing the brake fluid to flow from the reservoir tank 56, through the at least one aperture 68, to the bore 60. The closed position is defined as the pistons 64, 66 covering the holes 58 to prevent the brake fluid from flowing from the reservoir tank 56 to the bore 60 and apply a brake fluid pressure to the electro-hydraulic brake system 20. A force sensor 78 connected to the pedal 76 for determining the amount of force applied to the pedal 76 by the user.

At least one elastic member 80, 82 is disposed in the bore 60 for returning the pistons 64, 66 from the closed position to the opened position. The at least one elastic member 80, 82 includes a first elastic member 80 and a second elastic member 82. The first elastic member 80 is located between the distal end 62 and the secondary piston 66. The second elastic member 82 is located between the secondary piston 66 and the primary piston 64. The master cylinder block 30 further defines a primary orifice 84 and a secondary orifice 86 for supplying the brake fluid to the manifold block 32 in the closed position. The primary orifice 84 is located adjacent to and spaced from the primary piston 64 and the hole 58. The secondary orifice 86 is located adjacent to and spaced from the secondary piston 66 and the hole 58.

A pedal feel emulator 90 connects to the primary orifice 84 for providing a resistance force to the primary piston 64 and the pedal 76 in response to the user pushing the pedal 76 to provide a resistance force to the user which simulates the feel of pressing the pedal 76. The pedal feel emulator 90 includes a pedal feel accumulator 92, a pedal feel line 94, a pedal feel check valve 96, and a pedal feel valve 98. The pedal feel line 94 extends between the pedal feel accumulator 92 and the primary orifice 84 connecting the pedal feel accumulator 92 with the primary orifice 84 for supplying brake fluid to the primary orifice 84 to establish the resistance force. The pedal feel check valve 96 is located in the pedal feel line 94 between the pedal feel accumulator 92 and the primary orifice 84 for allowing the brake fluid to flow from the pedal feel accumulator 92 to the primary orifice 84 while preventing backflow of the brake fluid flow into the pedal feel accumulator 92. The pedal feel valve 98 is located between the pedal feel accumulator 92 and the primary orifice 84, in a parallel relationship with the pedal feel check valve 96, allowing the brake fluid flow from the pedal feel accumulator 92 to the primary orifice 84. The pedal feel emulator 92 can further include a pressure sensor 100 located between the pedal feel check valve 96, the pedal feel valve 98, and the primary orifice 84 for monitoring the pressure of the brake fluid in the pedal feel line 94.

Figure 4:
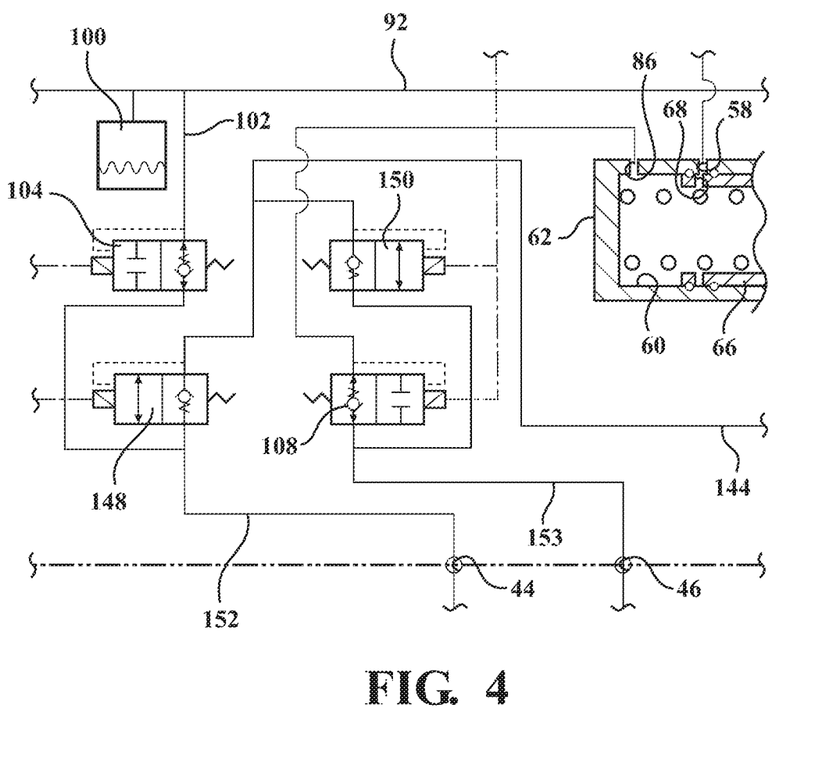
FIG. 4 is an enlarged schematic view of the master cylinder block including a primary valve, a secondary valve, and a pair of boost valves.

As best illustrated in FIG. 4, the master cylinder block 30 includes a first line 102 connecting the pedal feel line 94 to the primary opening 44 for supplying the brake fluid from the pedal feel line 94 to the primary opening 44. A primary valve 104 is located in the first line 102 for regulating the brake fluid flow from the pedal feel line 94 to the primary opening 44. A second line 106 connects the secondary orifice 86 with the secondary opening 46 for supplying the brake fluid to the secondary opening 46. A secondary valve 108 is located in the second line 106 for regulating the brake fluid flow from the secondary orifice 86 to the secondary opening 46.

Figure 5:
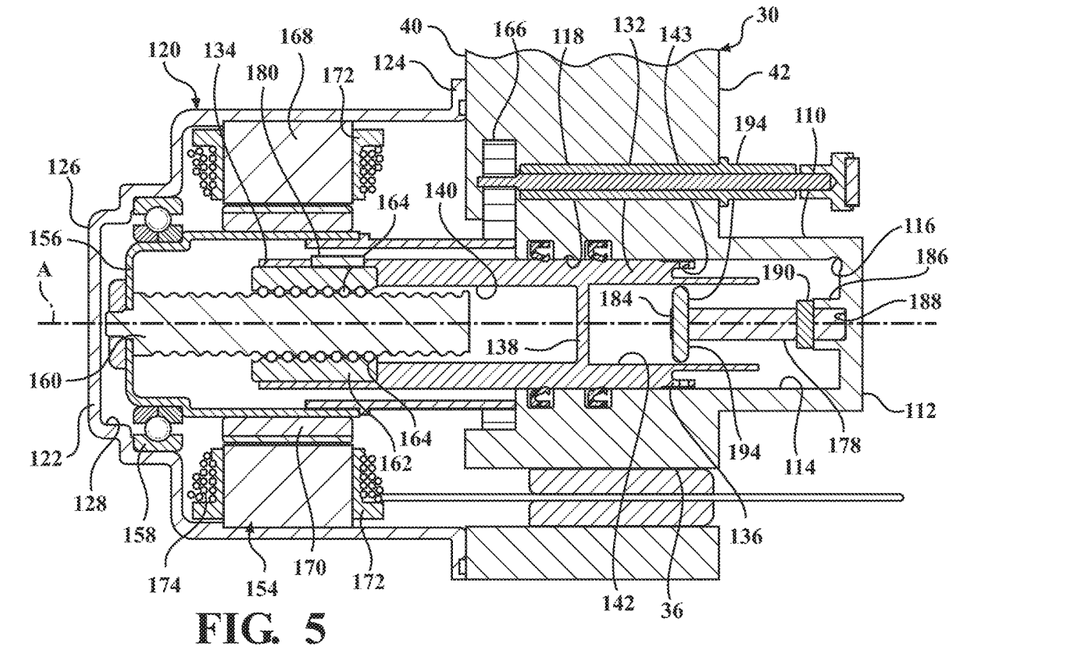
FIG. 5 is an fragmentary cross-sectional view of the master cylinder block including a pressure supply unit.
Figure 6:
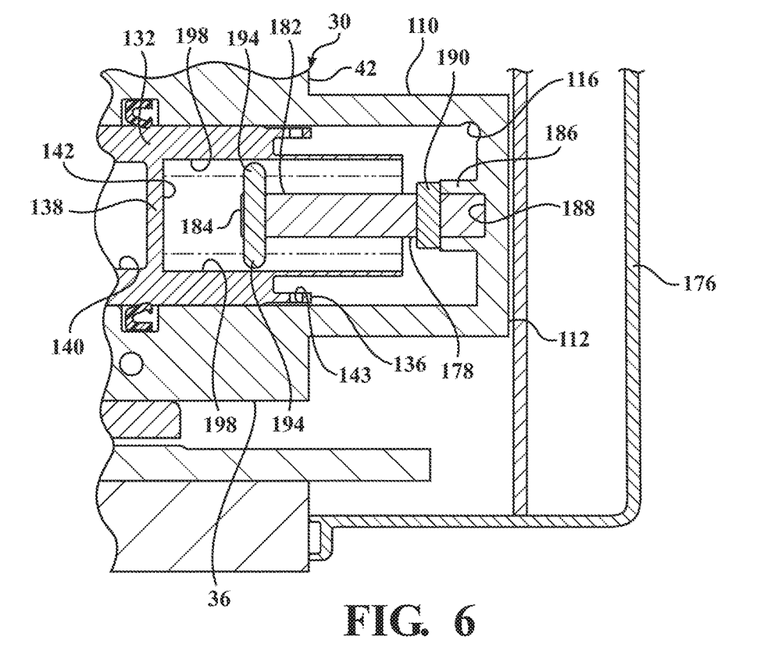
FIG. 6 is an fragmentary cross-sectional view of the master cylinder block including a pressure supply unit and a first electronic control unit.

As best shown in FIGS. 5 and 6, the master cylinder block 30 has a protrusion 110 located on the rear surface 42 of the master cylinder block 30, adjacent to said bottom surface 36, extending perpendicularly outwardly from the rear surface 42 to a terminal end 112. The front surface 40 of the master cylinder block 30 defines a channel 114, having a generally cylindrical shape, adjacent to the bottom surface 36 and extending along a center axis A through the front surface 40 and the rear surface 42 into the protrusion 110 and terminating prior to the terminal end 112 of the protrusion 110. The master cylinder block 30 defines a first perforation 116 and a second perforation 118 in fluid communication with the channel 114. The first perforation 116 is located adjacent to the terminal end 112 of the protrusion 110 and connects to the primary and secondary openings 44, 46. The second perforation 118 is located between the front surface 40 and the rear surface 42 and connects to the reservoir tank 56 and the primary and secondary openings 44, 46.

A pressure supply unit 120 attaches to the front surface 40 of the master cylinder block 30, perpendicular to the front surface 40, covering the channel 106 and in fluid communication with the reservoir tank 56 for supplying the brake fluid from the reservoir tank 56 to the manifold block 32 for providing braking and deceleration to the vehicle. The pressure supply unit 120 has a housing 122, having a generally cylindrical shape, extending along the center axis A, between an opened end 124 and a closed end 126. The housing 122 defines a chamber 128, having a generally cylindrical shape, extending between the opened end 124 and the closed end 126. A plurality of fasteners 130 extends through the housing 122 attaching the pressure supply unit 120 to the master cylinder block 30.

A displacement piston 132, having a generally tubular shape, is slidably disposed in the channel 114 and extends along the center axis A between primary end 134 and a secondary end 136. The primary end 134 is located in the chamber 128 and the secondary end 136 is located adjacent to the terminal end 112. An intermediate portion 138, having a generally circular shape, is attached to the displacement piston 132 between the primary end 134 and the secondary end 136 defining a first compartment 140 and a second compartment 142. The first compartment 140, in fluid communication with the chamber 128, extends between the primary end 134 and the intermediate portion 138. The second compartment 142, in fluid communication with the channel 114, extends between the secondary end 136 and the intermediate portion 138. The displacement piston 132 defines at least one passage 143 located adjacent to the primary end 138 for allowing the brake fluid to flow through the displacement piston 132.

Referring back to FIGS. 3 and 4, the master cylinder block 30 has a displacement piston line 144 connecting the first perforation 116 to the second perforation 118. In addition, the displacement piston line 144 also connects to the first line 102 and the second line 104 to facilitate with the transfer of the brake fluid to the manifold block 32. A displacement piston check valve 146 is located in the displacement piston line 144 between the first perforation 116 and the second perforation 118 to prevent backflow of the brake fluid through the first perforation 116.

A pair of boost valves 148, 150, located in the displacement piston line 144, regulates the brake fluid flow from the pressure supply unit 120 to the primary opening 44 and the secondary opening 46. In other words, the boost valves 148, 150 allows and prevents the brake fluid from flowing through the displacement piston line 144. The boost valves 148, 150 include a primary boost valve 148 and a secondary boost valve 150. The primary boost valve 148 is located in the displacement piston line 144, in a parallel relationship with said primary valve 104, between the displacement piston check valve 146 and the primary opening 44. The secondary boost valve 150 is located in the displacement piston line 144, in a parallel relationship with said secondary valve 108, between the displacement piston check valve 146 and the secondary opening 46. A first fluid transfer line 152 connects the primary boost valve 148 and the primary valve 104 to the primary opening 44. A second fluid transfer line 153 connects the secondary boost valve 150 and the secondary valve 108 to the secondary opening 46. The arrangement of the boost valves 148, 150, the primary valve 104, and the secondary valve 108 allows the master cylinder block 30 to immediately switch from using the pressure supply unit 120 to the pistons 64, 66 in response to a failure of the pressure supply unit.

As best shown in FIGS. 3 and 5, an actuator 154 is disposed in the chamber 128 and rotatably coupled to the displacement piston 132 for moving the displacement piston 132 along the center axis A between an extended position and a retracted position. The extended position is defined as the secondary end 136 of the displacement piston 132 being disposed adjacent to the terminal end 112 of the protrusion 110 to increase the brake fluid pressure in the electro-hydraulic brake system 20 and supply the brake fluid to the primary and secondary openings 44, 46. The retracted position is defined as the primary end 134 of the displacement piston 132 being disposed adjacent to the closed end 126 of the housing 122 to reduce the brake fluid pressure in the electro-hydraulic brake system 20. While in the retracted position, the passage 143 is also in alignment with the second perforation 118 to allow brake fluid flow from the reservoir tank 56 to the channel 114.

A rotor 156, having a generally U-shaped cross-section, is disposed in the chamber 128 and extends along the center axis A. One end of the rotor 156 is rotatably attached to the closed end 126 of the housing 122. Another end of the rotor 156 is in an abutment relationship with the front surface 40 of the master cylinder block 30. A plurality of bearings 158, located in the chamber 128 and between the housing 122 and the rotor 156, allows the rotor 156 to rotate about the center axis A relative to the housing 122. A threaded shaft 160, having a generally cylindrical shape, extends along the center axis A with one end of the threaded shaft 160 coupled to the rotor 156 for rotation with the rotor 156. The threaded shaft 160 extends into the first compartment 140 and is spaced from the displacement piston 132. A threaded bushing 162, having a generally tubular shape, disposed in the first compartment 140 between the threaded shaft 160 and the displacement piston 132 and extends annularly about the center axis A. A plurality of ball screws 164, disposed in the first compartment 140, between the threaded shaft 160 and the threaded bushing 162 and about said center axis, allows the threaded shaft 160 to rotate about the displacement piston 132 and move the displacement piston 132 along the center axis A between the extended position and the retracted position. A rev counter 166 is attached to the master cylinder block 30 and is coupled to the secondary end 136 of the rotor 156 for monitoring the rotation of the rotor 156.

A plurality of sleeves 168, 170, including a first sleeve 168 and a second sleeve 170, is disposed in the chamber 128 to facilitate with the rotation of the rotor 156. The first sleeve 168 is located in the chamber 128, attached to the housing 122 and radially spaced from the rotor 156, extending about the center axis A. The second sleeve 170 is located in the chamber 128, attached to the rotor 156 and radially spaced from the first sleeve 168, extending annularly about the center axis A. A pair of bobbins 172, spaced from one another, is disposed adjacent to the first sleeves 168 sandwiching the first sleeve 168 between the bobbins 172. A plurality of coils 174 extends about the bobbins 172 and the center axis A. The coils 174 are electrically connected to a power source 176 to receive power and generate a magnetic field to facilitate with the rotation of the rotor 156.

As best shown in FIGS. 1 and 6, the master cylinder block 30 has a first electronic control unit 176 coupled to the rear surface 42 of the master cylinder block 30 and in an abutment relationship with the protrusion 110 allowing the master cylinder block 30 to also serve as a heat sink or ground for the first electronic control unit 176. The first electronic control unit 176 is in communication with the boost valves 148, 150, the pressure supply unit 120 and the force sensor 88 to selectively control the boost valves 148, 150 and the pressure supply unit 120 and regulate the fluid pressure from the master cylinder block 30 to the manifold block 32 based on a feedback received from the force sensor 88.

As best illustrated in FIGS. 5-8, a first anti-rotational member 178 is disposed in the channel 114, coupled to the terminal end 112 for engaging the secondary end 136 of the displacement piston 132 to prevent rotation of the displacement piston 132 and translate the rotational movement of the actuator 154 into an axial movement. In other words, to move the displacement piston 132 from the retracted position to the extended position, the rotor 156 rotates the threaded shaft 160. The first anti-rotational member 178 engages the secondary end 136 of the displacement piston 132 thereby preventing displacement piston 132 from rotating with the threaded shaft 160. Accordingly, the threaded bushing 162 and the ball screws 164 translate the rotational movement of the threaded shaft 160 into an axial movement thereby moving the displacement piston 132 axially in the channel 114 between the extended position and the retraced position. In addition, in the event of a pressure supply unit 120 failure, the first-anti rotational member 178 restricts the rotational movement of the displacement piston 132 thereby locking the displacement piston 132 in its position to prevent changes in the brake fluid pressure in the electro-hydraulic brake system 20. A second anti-rotational member 180 is located between the actuator 154 and the primary end 134 of the displacement piston 132 to prevent rotation of the displacement piston 132 and translate rotational movement of the actuator 154 into an axial movement. In one arrangement, the second anti-rotational member 180 is located between the threaded bushing 162 and the displacement piston 132 and attaches to the threaded bushing 162 and the displacement piston 132. By fixating the threaded bushing 162 to the displacement piston 132, the second anti-rotational member 180 prevents the threaded bushing 162 from rotating with the threaded shaft 160. While working in conjunction with the first anti-rotational member 178, the second anti-rotational member 180 translates the rotational movement of the actuator 154 into an axial movement.

Figure 7:
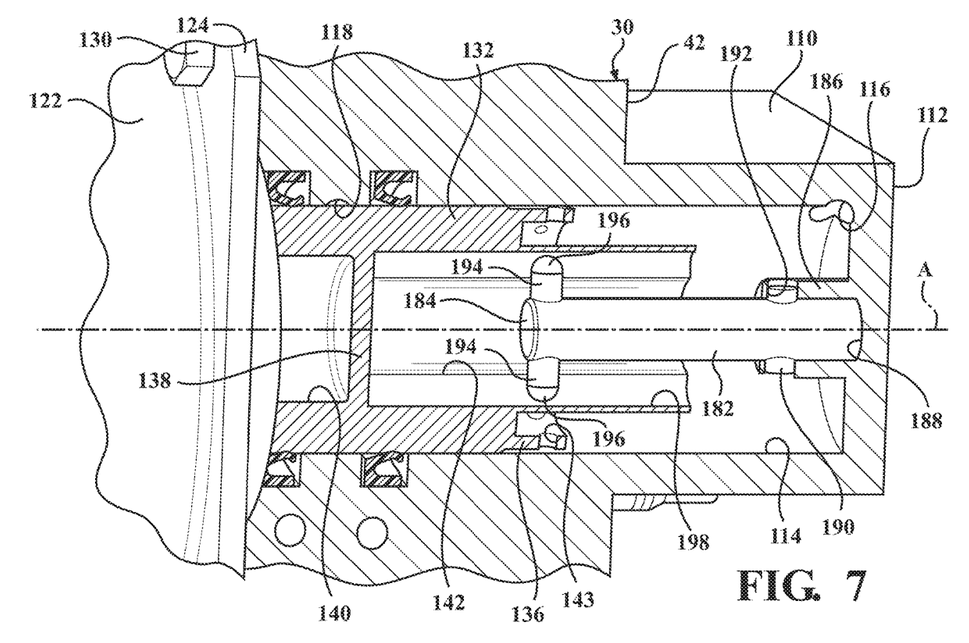
FIG. 7 is an fragmentary cross-sectional view of the master cylinder block including a pressure supply unit and a first anti-rotational member.
Figure 8:
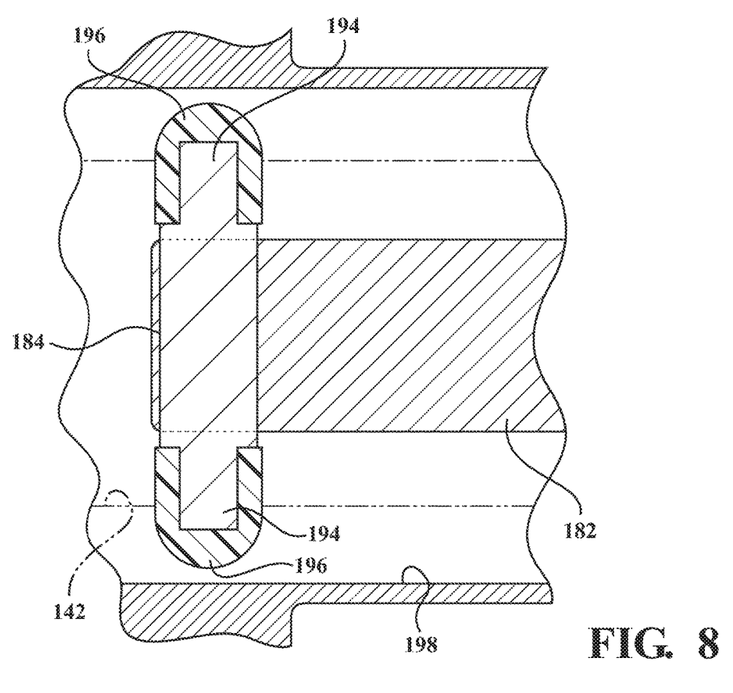
FIG. 8 is an enlarged side view of the front view of the first anti-rotational member.

As best illustrated in FIGS. 7-8, the first anti-rotational member 178 has a body 182 disposed in the channel 114. One end of the body 182 attaches to the terminal end 110 of the protrusion 112 and extends outwardly from the terminal end 110 along the center axis A to a body end 184. The protrusion 110 includes a boss 186, located in the channel 114, extending outwardly from the terminal end 112 and annularly about the center axis A to define a recess 188 for receiving the body 182. In other words, the body 182 of the first anti-rotational member 178 can be simply press fitted into the recess 188 thereby reducing the cost in manufacturing the electro-hydraulic brake system 20. The body 182 includes a pair of projections 190 extending radially outwardly from the body 182 and in an abutment relationship with the boss 186. The boss 186 defines a pair of slots 192, opposite of one another, for receiving the projections 190 to prevent the rotation of the body 182. In other words, as the body 182 is being press fitted into the recess 188, the slots 192 of the boss 186 also receive the projections 190 preventing any rotational movement of the body 182. A pair of nubs 194 extends radially outwardly from the body end 182, opposite of one another and perpendicular to the center axis A, for engaging the displacement piston 132. A cap 196 is disposed on each one of the nubs 194 and is in an abutment relationship with the displacement piston 132. The displacement piston 132 further defines a pair of grooves 198, opposite and spaced of one another, extending from the secondary end 136 toward the primary end 138 for receiving the nub 194 and the cap 196 to prevent the rotational movement of the displacement piston 132.

Figure 9:
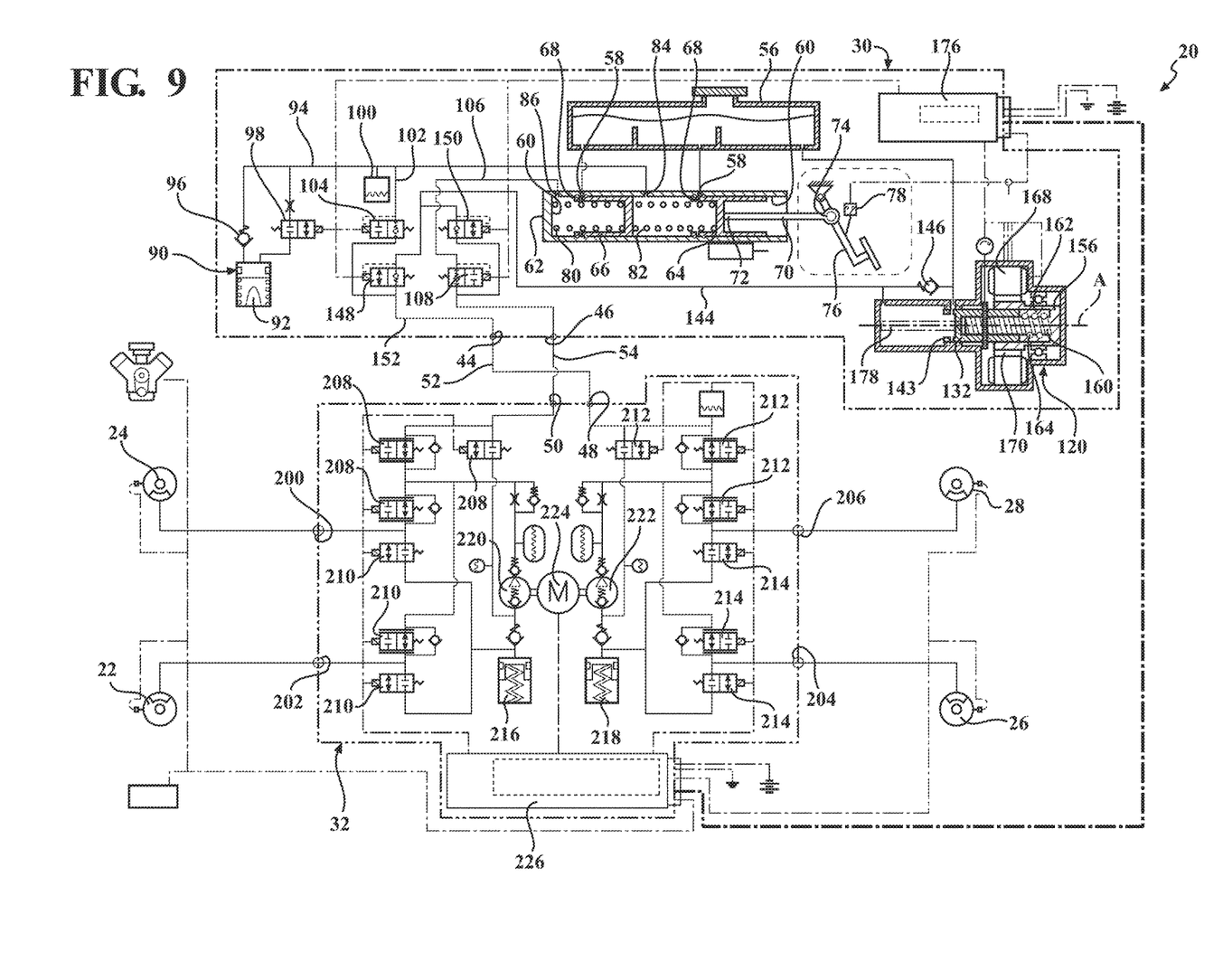
FIG. 9 is a schematic view of one embodiment of the electro-hydraulic brake system used with a rear-wheel drive vehicle.

FIG. 9 illustrates the electro-hydraulic brake assembly 20 in accordance with one embodiment of the present invention. More specifically, FIG. 9 shows the electro-hydraulic brake assembly 20 being used in connection with a rear wheel drive vehicle. The manifold block 32, also known as the stability control unit 32, connects to the master cylinder block 30 to receive the brake fluid from the master cylinder block 30 and supplies the brake fluid to the wheel brakes 22, 24, 26, 28 of the vehicle.

The manifold block 32 defines a plurality of outlets 200, 202, 204, 206 for fluid connection with the wheel brakes 22, 24, 26, 28 to supply the brake fluid to the wheel brakes 22, 24, 26, 28. The outlets 200, 202, 204, 206 include a first outlet 200, a second outlet 202, a third outlet 204, and a fourth outlet 206, spaced from one another. The first outlet 200 is in fluid communication with a right front wheel brake 24. The second outlet 202 is in fluid communication with a left front wheel brake 22. The third outlet 204 is in fluid communication with a right rear wheel brake 28. The fourth outlet 206 is in fluid communication with a left rear wheel brake 26. The primary inlet 48 is in communication with the third outlet 204 and the fourth outlet 206 for transferring the brake fluid to the left rear wheel brake 26 and the right rear wheel brake 28. The secondary inlet 50 is in communication with the first outlet 200 and the second outlet 202 for transferring the brake fluid to the left front wheel brake 22 and the right front wheel brake 24.

A plurality of stability valves 208, 210, 212, 214 are located between the inlets 48, 50 and the outlets 200, 202, 204, 206 for controlling the flow of the brake fluid and varying the brake fluid pressure at the wheel brakes 22, 24, 26, 28 to provide ride stability to the user. The plurality of stability valves 208, 210, 212, 214 includes a first set of stability valves 208, a second set of stability valves 210, a third set of stability valves 212, and a fourth set of stability valves 214. The first set of stability valves 208 are located between the first outlet 200 and the secondary inlet 50 for controlling the flow of the brake fluid from the second inlet 130 to the right front wheel brake 24. The second set of stability valves 210 are located between the second outlet 202 and the secondary inlet 50 for controlling the flow of the brake fluid from the second inlet 50 to the left front wheel brake 22. The third set of stability valves 212 are located between the third outlet 204 and the first inlet 48 for controlling the flow of the brake fluid from the first inlet 48 to the right rear wheel brake 28. The fourth set of stability valves 214 are located between the fourth outlet 206 and the first inlet 48 for controlling the flow of the brake fluid from the first inlet 48 to the left rear wheel brake 26.

The manifold block 32 further includes at least one manifold accumulator 216, 218 disposed in fluid communication with the stability valves 208, 210, 212, 214. In one arrangement, the at least one manifold accumulator 216, 218 includes a first manifold accumulator 216 and a second manifold accumulator 218. The first manifold accumulator 216 is in fluid communication with the first and second set of stability valves 208, 210. The second manifold accumulator 218 is in fluid communication with the third and fourth set of stability valves 212, 214. A front wheel brake pump 220 is disposed between the first and the second sets of stability valves 208, 210 and the first manifold accumulator 216 for supplying a fluid pressure to the front wheel brakes 22, 24. A rear wheel brake pump 222 is disposed between the third and the fourth sets of stability valves 212, 214 and the second manifold accumulator 218 for supplying a fluid pressure to the rear wheel brakes 26, 28. A motor 224 connects to the front wheel brake pump 220 and the rear wheel brake pump 222 for driving the front wheel brake pump 220 and the rear wheel brake pump 222 to provide the fluid pressure to the front wheel brake 22, 24 and the rear wheel brake 26, 28. It should be appreciated that each of the wheel brakes 22, 24, 26, 28 can include at least one wheel brake sensor (not shown) for monitoring the brake fluid pressure.

A second electronic control unit 226 attaches to the manifold block 32 for controlling the manifold block 32. The manifold block is in electronic communication with the sensor, the stability valves 208, 210, 212, 214, and the motor 224. Based on the feedback received from the wheel brake sensor (not shown), the electronic control unit 226 can selectively open/close the stability valves 208, 210, 212, 214 and vary the speed of the motor 224 to adjust the fluid pressure within the manifold block 32 to provide stability to the vehicle. It should be appreciated that the second electronic control unit 226 can also be in electronic communication with the first electronic control unit 176 to receive feedback from the master cylinder block 30 and control the stability of the vehicle.

Figure 10:
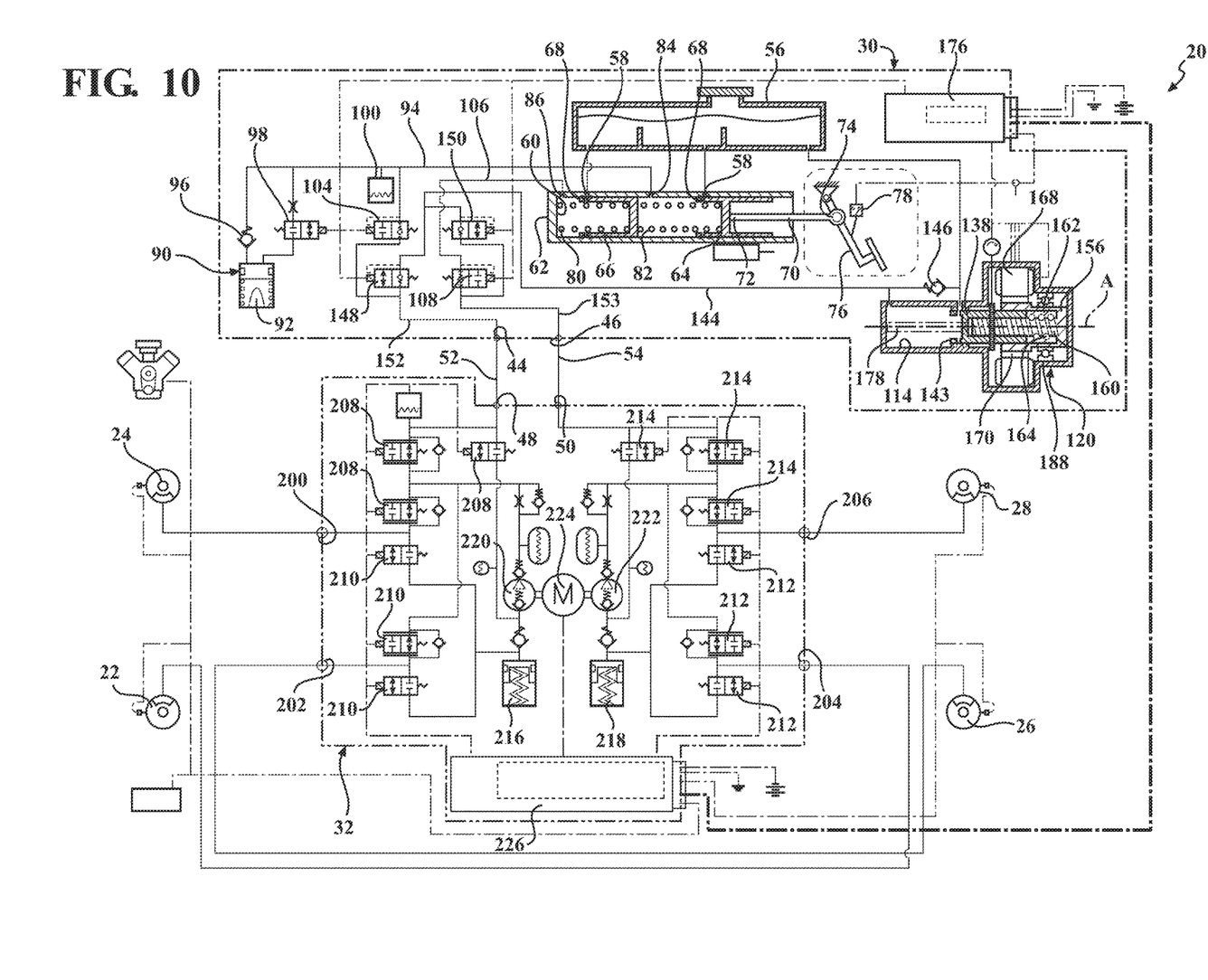
FIG. 10 is a schematic view of an alternative embodiment of the electro-hydraulic brake system used with a front-wheel drive vehicle.

FIG. 10 illustrates the electro-hydraulic brake assembly 20 in accordance with an alternative embodiment of the present invention. More specifically, FIG. 10 shows the electro-hydraulic brake assembly 20 being used in connection with a front wheel drive vehicle. Similar to the electro-hydraulic brake system in FIG. 9, the manifold block 32 connects to the master cylinder block 30 to receive the brake fluid from the master cylinder block 30 and supplies the brake fluid to the wheel brakes 22, 24, 26, 28 of the vehicle.

The manifold block 32 defines a plurality of outlets 200, 202, 204, 206 for fluid connection with the wheel brakes 22, 24, 26, 28 to supply the brake fluid to the wheel brakes 22, 24, 26, 28. The outlets 200, 202, 204, 206 include a first outlet 200, a second outlet 202, a third outlet 204, and a fourth outlet 206, spaced from one another. The first outlet 200 is in fluid communication with a right front wheel brake 24. The second outlet 202 is in fluid communication with a left front wheel brake 22. The third outlet 204 is in fluid communication with a right rear wheel brake 28. The fourth outlet 206 is in fluid communication with a left rear wheel brake 26. The primary inlet 48 is in communication with the first outlet 200 and the second outlet 202 for transferring the brake fluid to the left front wheel brake 22 and the right front wheel brake 24. The secondary inlet 50 is in communication with the third outlet 204 and the fourth outlet 206 for transferring the brake fluid to the left rear wheel brake 26 and the right rear wheel brake 28.

A plurality of stability valves 208, 210, 212, 214 are located between the inlets 48, 50 and the outlets 200, 202, 204, 206 for controlling the flow of the brake fluid and varying the brake fluid pressure at the wheel brakes 22, 24, 26, 28 to provide ride stability to the user. The plurality of stability valves 208, 210, 212, 214 includes a first set of stability valves 208, a second set of stability valves 210, a third set of stability valves 212, and a fourth set of stability valves 214. The first set of stability valves 208 are located between the first outlet 200 and the primary inlet 48 for controlling the flow of the brake fluid from the primary inlet 48 to the right front wheel brake 24. The second set of stability valves 210 are located between the second outlet 202 and the primary inlet 48 for controlling the flow of the brake fluid from the primary inlet 48 to the left front wheel brake 22. The third set of stability valves 212 are located between the third outlet 204 and the secondary inlet 50 for controlling the flow of the brake fluid from the first inlet 48 to the right rear wheel brake 28. The fourth set of stability valves 214 are located between the fourth outlet 206 and the secondary inlet 50 for controlling the flow of the brake fluid from the secondary inlet 50 to the left rear wheel brake 26.

The manifold block 32 further includes at least one manifold accumulator 216, 218 disposed in fluid communication with the stability valves 208, 210, 212, 214. In one arrangement, the at least one manifold accumulator 216, 218 includes a first manifold accumulator 216 and a second manifold accumulator 218. The first manifold accumulator 216 is in fluid communication with the first and second set of stability valves 208, 210. The second manifold accumulator 218 is in fluid communication with the third and fourth set of stability valves 212, 214. A front wheel brake pump 220 is disposed between the first and the second sets of stability valves 208, 210 and the first manifold accumulator 216 for supplying a fluid pressure to the front wheel brakes 22, 24. A rear wheel brake pump 222 is disposed between the third and the fourth sets of stability valves 212, 214 and the second manifold accumulator 218 for supplying a fluid pressure to the rear wheel brakes 26, 28. A motor 224 is connected to the front wheel brake pump 220 and the rear wheel brake pump 222 for driving the front wheel brake pump 220 and the rear wheels brake pump 222 to provide the fluid pressure to the front wheel brakes 22, 24 and the rear wheel brakes 26, 28.

In normal operation, when the user start the vehicle, the electro-hydraulic brake system 20 becomes energized. When energized, the primary valve 104 and the secondary valve 108 close the fluid communication between the bore 60 and the primary and secondary openings 44, 46. At the same time, the primary and secondary boost valve 148, 150 open the displacement piston line 144 allowing fluid communication between the pressure supply unit 120 and the primary and secondary openings 44, 46. As the user applies a force to the pedal 76, the force sensor 88 measures the applied force and sends a signal to the first electronic control unit 176. In response, the brake feel emulator 90 applies a resistance force, via an increase in the brake fluid pressure, in the bore 60 to provide the user with a feel. At the same time, the first electronic control unit 176 sends a signal to the pressure supply unit 120 instructing the pressure supply unit 120 to supply a brake fluid pressure to the manifold block 32 via the displacement piston line 144 and the primary and secondary openings 44, 46.

To supply the brake fluid pressure to the manifold block 32, the displacement piston 132 is moved from the retracted position to the extended position. While in the retracted position, the passage 143 is in alignment with the second perforation 118 to allow the brake fluid to flow from the reservoir tank 56 to the channel 114. As the displacement piston 132 moves from the retracted position to the extended position, the displacement piston 132 pushes the brake fluid in the channel 114 through the first and second perforation 116, 118 to the primary and secondary openings 44, 46. To move the displacement piston 132 from the retracted position to the extended position, the rotor 156 rotates the threaded shaft 160. The first anti-rotational member 178 engages the secondary end 136 of the displacement piston 132 thereby preventing displacement piston 132 from rotating with the threaded shaft 160. Accordingly, the threaded bushing 162 and the ball screws 164 translate the rotational movement of the threaded shaft 160 into an axial movement thereby moving the displacement piston 132 axially in the channel 114 between the extended position and the retraced position.

In the event of a pressure supply unit 120 failure, upon receiving a signal from the first electronic control unit 176, the primary and secondary boost valves 148, 150 deactivates to prevent any brake fluid flow from the displacement piston line 144 to the primary and secondary openings 44, 46. At the same time, the primary and the secondary valves 104, 106 open thereby allowing brake fluid flow from the bore 60, via the actions of the pistons 64, 66, to the primary and secondary openings 44, 46. In other words, when the pressure supply unit 120 fails, the primary and secondary boost valves 148, 150 deactivates thereby cutting off the brake fluid flow from the displacement piston line 144. At the same time, the primary and the secondary valves 104, 106 activates thereby allowing the brake fluid to flow from the bore 60, via the actions of the pistons 64, 66, e.g. the master cylinder mode, to the primary and secondary openings 44, 46 to supply the brake fluid to the manifold block 32. In addition, during the pressure supply unit 120 failure, the first-anti rotational member 178 restricts the rotational movement of the displacement piston 132 thereby locking the displacement piston 132 in its position to prevent changes in the brake fluid pressure in the electro-hydraulic brake system 20.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An electro-hydraulic brake system for a vehicle, comprising:
    a master cylinder block disposed in fluid communication with a reservoir tank containing a brake fluid;
    a protrusion extending outwardly from a rear surface of said master cylinder block to a terminal end;
    said master cylinder block defining a channel extending along a center axis into said protrusion and spaced from said terminal end;
    a pressure supply unit coupled to said master cylinder block and in fluid communication with said reservoir tank for supplying the brake fluid from said reservoir tank;
    said pressure supply unit including a housing defining a chamber;
    a displacement piston slidably disposed in said channel and extending along said center axis between a primary end and a secondary end with said primary end being disposed in said chamber and said secondary end being disposed in said channel;
    an actuator disposed in said chamber and rotatably coupled to said displacement piston for moving said displacement piston along said center axis; and
    a first anti-rotational member disposed in said channel and coupled to said terminal end for engaging said secondary end of said displacement piston to prevent rotation of said displacement piston and translate rotational movement of said actuator into an axial movement.

2. The electro-hydraulic brake system accordingly to claim 1 further including a second anti-rotational member located between said actuator and said primary end of said displacement piston to translate rotational movement of said actuator into an axial movement.

3. The electro-hydraulic brake system according to claim 1 wherein said first anti-rotational member includes a body disposed in said channel, attached to said terminal end, extending outwardly from said terminal end along said center axis to a body end.

4. The electro-hydraulic brake system according to claim 3 further including a boss extending outwardly from said terminal end and defining a recess for receiving said body.

5. The electro-hydraulic brake system according to claim 4 wherein said body includes a pair of projections extending radially outwardly from said body and in an abutment relationship with said boss.

6. The electro-hydraulic brake system according to claim 5 wherein said boss defines a pair of slots disposed diametrically opposite of one another for receiving said projections to prevent the rotation of said body.

7. The electro-hydraulic brake system according to claim 3 further including a pair of nubs extending radially outwardly from said body end, opposite of one another and perpendicular to said center axis to a pair of nub ends, for engaging said displacement piston.

8. The electro-hydraulic brake system according to claim 7 further including a cap disposed on each one of said nub ends for engaging said displacement piston.

9. The electro-hydraulic brake system according to claim 8 wherein said displacement piston defines a pair of grooves, opposite and spaced of one another, extending from said secondary end toward said primary end for receiving said nub and said cap to prevent said displacement piston from rotating about said center axis.

10. The electro-hydraulic brake system according to claim 9 wherein said displacement piston is disposed in a perpendicular relationship relative to a front surface of said master cylinder block.

11. An electro-hydraulic brake system for a vehicle, comprising:
  a master cylinder block disposed in fluid communication with a reservoir tank containing a brake fluid;
  a manifold block disposed in fluid communication with said master cylinder block for supplying the brake fluid from said master cylinder block to wheel brakes of the vehicle;
  a protrusion extending outwardly from a rear surface of said master cylinder block to a terminal end;
  said master cylinder block defining a channel extending along a center axis into said protrusion and spaced from said terminal end;
  a pressure supply unit coupled to said master cylinder block and in fluid communication with said reservoir tank for supplying the brake fluid from said reservoir tank;
  said pressure supply unit including a housing defining a chamber;
  a displacement piston slidably disposed in said channel and extending along said center axis between a primary end and a secondary end with said primary end being disposed in said chamber and said secondary end being disposed in said channel;
  an actuator disposed in said chamber and rotatably coupled to said displacement piston for moving said displacement piston along said center axis; and
  a first anti-rotational member disposed in said channel and coupled to said terminal end for engaging said secondary end of said displacement piston to prevent rotation of said displacement piston and translate rotational movement of said actuator into an axial movement.

12. The electro-hydraulic brake system accordingly to claim 11 further including a second anti-rotational member located between said actuator and said primary end of said displacement piston to translate rotational movement of said actuator into an axial movement.

13. The electro-hydraulic brake system according to claim 11 wherein said first anti-rotational member includes a body disposed in said channel, attached to said terminal end, extending outwardly from said terminal end along said center axis to a body end.

14. The electro-hydraulic brake system according to claim 13 further including a boss extending outwardly from said terminal end and defining a recess for receiving said body.

15. The electro-hydraulic brake system according to claim 14 wherein said body includes a pair of projections extending radially outwardly from said body for engaging said boss.

16. The electro-hydraulic brake system according to claim 15 wherein said boss defines a pair of slots disposed diametrically opposite of one another for receiving said projections to prevent the rotation of said body.

17. The electro-hydraulic brake system according to claim 16 further including a pair of nubs extending radially outwardly from said body end, opposite of one another and perpendicular to said center axis to a pair of nub ends, for engaging said displacement piston.

18. The electro-hydraulic brake system according to claim 17 further including a cap disposed on each one of said nub ends for engaging said displacement piston.

19. The electro-hydraulic brake system according to claim 18 wherein said displacement piston defines a pair of grooves, opposite and spaced of one another, extending from said secondary end toward said primary end for receiving said nub and said cap to prevent said displacement piston from rotating about said center axis.

20. The electro-hydraulic brake system according to claim 19 wherein said displacement piston is disposed in a perpendicular relationship relative to a front surface of said master cylinder block.

* * * * *